(12) United States Patent
Dean

(10) Patent No.: US 11,670,052 B1
(45) Date of Patent: Jun. 6, 2023

(54) SYSTEMS AND METHODS FOR REPRESENTING, ACCESSING, AND MOVING WITHIN A THREE-DIMENSIONAL ENVIRONMENT USING A MUTABLE TREE DATA STRUCTURE

(71) Applicant: Illuscio, Inc., Culver City, CA (US)

(72) Inventor: Kevin Edward Dean, Greenwood, IN (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/147,093

(22) Filed: Dec. 28, 2022

(51) Int. Cl.
*G06T 17/00* (2006.01)
*G06T 19/00* (2011.01)

(52) U.S. Cl.
CPC .......... *G06T 19/003* (2013.01); *G06T 17/005* (2013.01)

(58) Field of Classification Search
CPC .................................................. G06T 17/005
See application file for complete search history.

(56) References Cited

U.S. PATENT DOCUMENTS

| | | | |
|---|---|---|---|
| 2019/0035138 A1* | 1/2019 | Fuetterling | G06T 15/06 |
| 2020/0211268 A1* | 7/2020 | Vaidyanathan | G06T 15/06 |
| 2021/0295463 A1* | 9/2021 | Mandal | G06T 15/005 |

* cited by examiner

*Primary Examiner* — Ryan McCulley
(74) *Attorney, Agent, or Firm* — Ansari Katiraei LLP; Arman Katiraei; Sadiq Ansari (57) ABSTRACT

Disclosed is a system and associated methods for generating a mutable tree to efficiently access data within a three-dimensional ("3D") environment. The system generates the mutable tree with a root node defined at a root node position, a first branch with nodes for each of a first set of subdivided regions that are a first distance from the root node position, and a second branch with nodes for each of a second set of subdivided regions that are a second distance from the root node position. The system sorts the mutable tree in response to a request to access data from a first position within the 3D environment so that the first node in the first branch is the first subtree node that is closest to the first position, and the first node in the second branch is the second subtree node that is closest to the first position.

20 Claims, 9 Drawing Sheets

SYSTEMS AND METHODS FOR REPRESENTING, ACCESSING, AND MOVING WITHIN A THREE-DIMENSIONAL ENVIRONMENT USING A MUTABLE TREE DATA STRUCTURE

BACKGROUND

Three-dimensional ("3D") images and 3D file formats contain large amounts of data. Octrees and/or other tree structures are used to arrange and create a monolithic representation of the 3D image data. For instance, a point cloud is a 3D format that has millions or billions of data points to represent different objects in a 3D environment. The point cloud data points may be arranged as leaf nodes of an octree, and each parent node at one or more levels above the leaf nodes represents a region that spans the leaf nodes or data points under that parent node. The octree root node represents the entire 3D environment or the 3D space encompassed by the point cloud data points.

The single tree representation is meant to improve searching within the represented 3D environment. For instance, searching for a particular region or position involves traversing down from the root node in the direction of the particular region or position until the parent node or leaf node representing the particular region or position is located. The tree traversal is more efficient than inspecting the positional elements of every data point in order to determine if that data point is within the searched for particular region or position.

The larger the tree representation grows by virtue of the 3D environment encompassing a larger space or having a greater number of objects within the represented space, the longer it takes to traverse the tree as the tree will have more levels to represent the greater amount of data. In other words, the size of the tree representation and the time to search the tree representation grows in proportion with the size or amount of data of the represented 3D environment.

Another issue is that the size of the octree may grow to exceed the memory of the device used to perform the traversals and/or 3D environment accessing, editing, searching, and/or processing. For instance, an octree that represents billions of point cloud data points may be too large to load into memory, which in turn, slows or prevents using the octree to access, edit, search, and/or process the 3D environment.

DETAILED DESCRIPTION OF PREFERRED EMBODIMENTS

The following detailed description refers to the accompanying drawings. The same reference numbers in different drawings may identify the same or similar elements.

Provided are systems and methods for representing, accessing, and moving within a three-dimensional ("3D") environment using a mutable tree data structure ("MTDS"). The MTDS represents any sized 3D environment or the data that forms the 3D environment as multiple subtrees organized under branches of a root node. In other words, rather than represent the 3D environment or all of the data forming the 3D environment in a monolithic or singular tree data structure, the MTDS subdivides the 3D environment, and generates a different subtree to represent the data within each subdivided region or volume of the 3D environment.

The MTDS continually rearranges each set of subtrees from a branch of the MTDS based on the distance between each of the subtrees and a current position within the MTDS or the 3D environment represented by the MTDS. As the position within the 3D environment changes, so too does the arrangement of the subtrees or nodes within each of the MTDS branches. The continuous rearranging of the MTDS reduces the time and processing needed to search and/or access the 3D data at a new position within the 3D environment. Specifically, a single distance calculation from a current position or root node position to a new position is sufficient to search within the MTDS and select a desired subset of 3D data or subtree at the new position within the 3D environment without the computational overhead of performing a top-to-bottom traversal of a single tree structure or inspecting the positional elements associated with each node in the single tree structure until the one or more nodes with positional elements corresponding to the new position are found.

The MTDS subtrees are generated with a maximum size so that the memory of the device used to perform the 3D environment accessing, editing, searching, and/or processing is not exceeded regardless of how large the 3D environment is or how much 3D data is represented in the MTDS. Consequently, the MTDS representation of a 3D environment as a tree with branches that link to ornaments or subtrees provides a structure that requires less memory and provides faster searching within 3D environments of varying sizes than a monolithic or singular tree representation of the same 3D environments.

Figure 1:
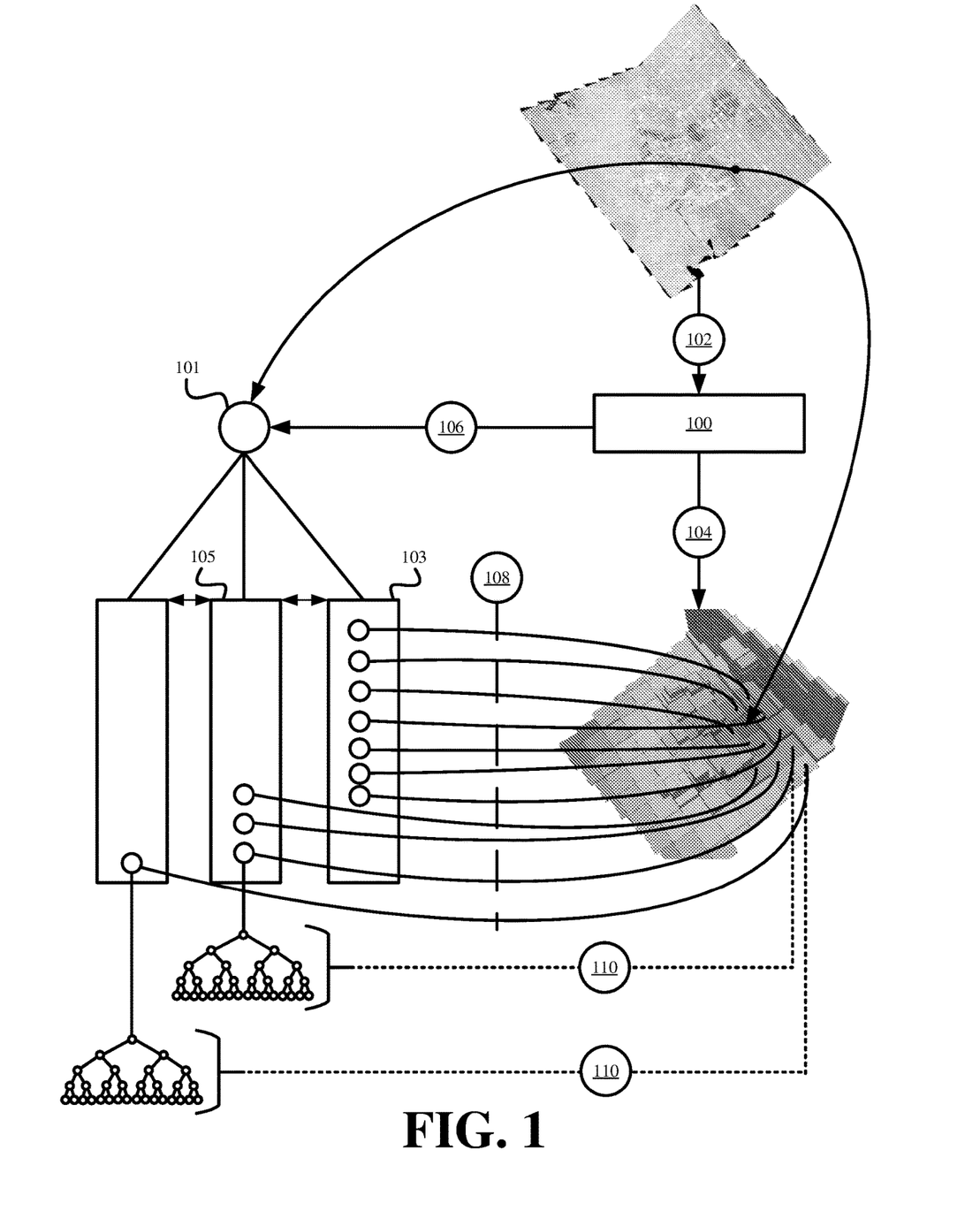
FIG. 1 illustrates an example of a mutable tree data structure ("MTDS") construction in accordance with some embodiments presented herein.

FIG. 1 illustrates an example of the MTDS construction in accordance with some embodiments presented herein. The MTDS is constructed by editing system 100. Editing system 100 includes one or more devices with hardware processors, memory, and/or other resources for accessing, editing, searching, and/or processing of 3D images, 3D file formats, and/or other datasets that represent a 3D environment using the generated MTDS representation of that 3D environment.

Editing system 100 receives (at 102) a file containing the 3D data of a 3D environment. The 3D data may include polygons, meshes, point cloud data points, and/or other primitives or constructs that collectively form the 3D environment and/or the objects, surfaces, and/or other features of the 3D environment.

Editing system 100 subdivides (at 104) the 3D environment into different volumes or regions. In some embodiments, each volume or region has the same size. The size may be set according to a maximum amount of 3D data to include within any single volume or region. In some other embodiments, each volume or region has one of several sizes. In some such embodiments, the volumes or regions are sized so that each volume or region contains an equal amount of 3D data despite the 3D data being defined with different densities across the 3D environment (e.g., the 3D environment encoding different amounts of 3D data and/or detail at different regions). For instance, a region in the 3D environment with a lower density of 3D data may be subdivided to a larger volume, and a region in the 3D environment with a higher density of 3D data may be subdivided to a smaller volume so that both the larger volume and the smaller volume contain an equal or proportional amount of 3D data or data points.

Editing system 100 defines (at 106) root node 101 for the MTDS of the 3D environment. Defining (at 106) root node 101 includes determining the center of mass in the 3D environment. In some embodiments, the center of mass is the region within the 3D environment that has the greatest density of 3D data. In some embodiments involving a point cloud, the center of mass is the volume within the point cloud that has the highest concentration of data points. In some other embodiments, the center of mass corresponds to the focal point of the 3D environment, the region with the greatest detail, the region that allows for an optimal traversal of a data structure (e.g., an octree, binary tree, etc.) that is used to represent the 3D data, and/or the region that is of most interest to the viewer. In some such embodiments, editing system 100 analyzes the subdivided (at 104) volumes or regions to identify the subset of volumes or regions with the highest concentration or density of data points or image data, and sets the center of mass based on the identified subset of volumes or regions. For instance, editing system 100 sets the center of mass at the center of the subset of volumes or regions. In some other embodiments, defining (at 106) root node 101 includes determining the center of the 3D environment, and setting root node 101 at the position or coordinates at the center of the 3D environment.

Editing system 100 arranges (at 108) the subdivided regions under different branches of the MTDS. Each branch is connected to and accessible from root node 101. As shown in FIG. 1, the subdivided regions immediately surrounding root node 101 (e.g., the first tier or first level subdivided regions) are arranged (at 108) under first branch 103 of the MTDS, the subdivided regions that are separated from root node 101 by the subdivided regions of the first tier or first level (e.g., subdivided regions arranged (at 108) to first branch 103) are arranged (at 108) under second branch 105 of the MTDS, and so on until all subdivided regions are arranged (at 108) to a branch that stems off MTDS root node 101. The subdivided volumes or regions are therefore arranged (at 108) to branches according to their distance from root node 101, and all subdivided volumes or regions in a particular branch are about equidistant from the position of root node 101 in the 3D environment or the 3D environment center of mass.

Editing system 100 generates (at 110) a different node in each branch for each subdivided region that is arranged (at 108) to that branch. Specifically, generating (at 110) a subtree node includes generating a tree-based representation for the 3D data or data points of the 3D environment within the subdivided region represented by that subtree node. The root node of the generated tree-based representation becomes the node in the MTDS branch for accessing the represented 3D data. In some embodiments, the root node of the generated tree-based representation includes positional elements that define the region or volume spanned by the represented 3D data and/or the represented subdivided region. For instance, editing system 100 may generate an octree, binary tree, or other tree to represent the set of data points that fall within a particular subdivided region of a point cloud. The root node of the octree becomes the subtree node within the trunk of the MTDS that is at the corresponding tier or level from MTDS root node 101.

As shown in FIG. 1, editing system 100 constructs the MTDS as a linked list of trees. Specifically, the MTDS includes root node 101, a set of branches for subdivided regions or volumes of the 3D environment that are different distances from root node 101, and nodes in each branch that correspond to octrees or other tree-based representations of the 3D data in one of the subdivided regions within that branch. The linked list of trees may be defined a single linked list, double linked list, circular linked list, or other linked list.

In some embodiments, the different branches are linked for nearest neighbor traversals and/or horizontal or direct traversals between the branches without traversing back up to root node 101. For instance, each branch may be defined as a different branch node that is linked to root node 101 and to the subtree nodes within the branch represented by that branch node. In other words, a traversal from root node 101 to a particular branch node is used to access the subtree nodes for the tree-based representations of the 3D data in one of the subdivided regions within the branch represented by that particular branch node. Each branch node is also linked to the branch nodes of the surrounding branches of the MTDS. The MTDS may therefore be traversed vertically by moving down or up between root node 101, the branch nodes, and the subtree nodes under each branch node, or horizontally by moving from one subtree node to a neighboring and/or connected subtree node.

In some embodiments, the different branches and subtree nodes are arranged in the MTDS according to the path of closest approach and/or distance of closest approach. With this MTDS arrangement, a distance calculation between the camera, render, and/or user position and root node 101 identifies which branch node encompasses the camera, render, and/or user position. Accordingly, the distance calculation is all that is needed to determine which branch node to traverse to from root node 101 in order to reach the camera, render, and/or user position.

The branch nodes and/or subtree nodes of the MTDS are mutable, and are rearranged to accelerate searches and 3D data access within the 3D environment. Specifically, editing system 100 continually rearranges the branch nodes and/or subtree nodes so that the subdivided regions or tree representations of those regions are sorted according to their respective distance from a current viewing or render position in the 3D environment. The sorting positions the 3D data for the volumes or regions of the 3D environment that are most likely to be accessed next at the top of the MTDS so that the 3D data is accessible with the fewest possible traversals of the MTDS and in the least amount of time.

Figure 2:
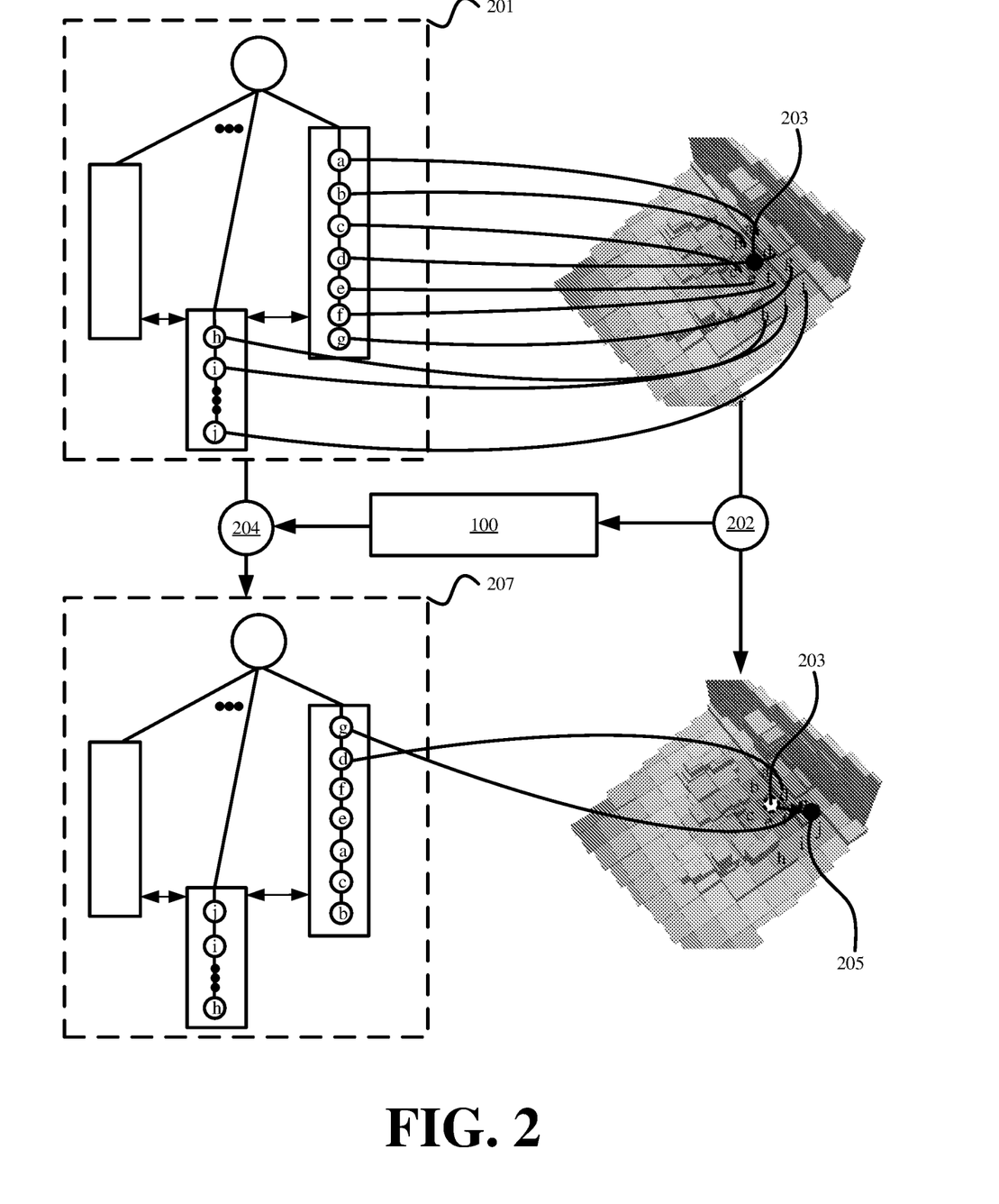
FIG. 2 illustrates an example of changing the arrangement of the MTDS branches and/or subtree nodes in accordance with some embodiments presented herein.

FIG. 2 illustrates an example of changing the arrangement of the MTDS branch nodes and/or subtree nodes in accordance with some embodiments presented herein. FIG. 2 illustrates first arrangement 201 of the MTDS branch nodes and/or subtree nodes generated for a default view of the 3D environment. For simplicity, first arrangement 201 includes first and second branch nodes that contain each subtree nodes for subdivided regions that are one or two tiers or levels removed from the root node.

In some embodiments, the default view is defined according to first render position 203 of a virtual camera that is centered on or positioned at the root node of the MTDS. First render position 203 may be defined according to the position of a user or the user's line-of-sight in a virtual reality, augmented reality, or mixed reality environment. Accordingly, the branch nodes and/or subtree nodes of the MTDS in first arrangement 201 are arranged based on their distance from first render position 203 from which the default view of the 3D environment is created.

The virtual camera position changes from the default or first render position 203 to second render position 205 in the 3D environment. From second render position 205, a different part or different set of 3D data from the 3D environment falls in the bounding box and/or field-of-view of the virtual camera. In some embodiments, the virtual camera position changes in response to input provided by a user, a defined animation for the 3D environment, and/or other machine-generated inputs.

Editing system 100 tracks (at 202) the change to the virtual camera position, and sorts (at 204) the MTDS accordingly. Specifically, editing system 100 rearranges (at 204) the branch nodes and/or subtree nodes based on their distance to second render position 205, and generates MTDS with second arrangement 207 of branch nodes and/or subtree nodes. In second arrangement 207, the subtree nodes are rearranged (at 204) based on the distance from second render position 205 to the subdivided volume or region of the 3D environment that is represented by each subtree node.

Consequently, the subtree nodes that contain 3D data that is closest to second render position 205 are moved closer to the MTDS root node in their respective branch. As shown in second arrangement 207, the subtree nodes within the different branches that are closest to second render position 205 are repositioned to become the topmost nodes in their respective branches and/or are linked directly to the respective branch node. The topmost node in a particular branch is the first node that is accessed when traversing from the MTDS root node to that particular branch (e.g., the first node that is accessible from the branch node of that particular branch).

Figure 3:
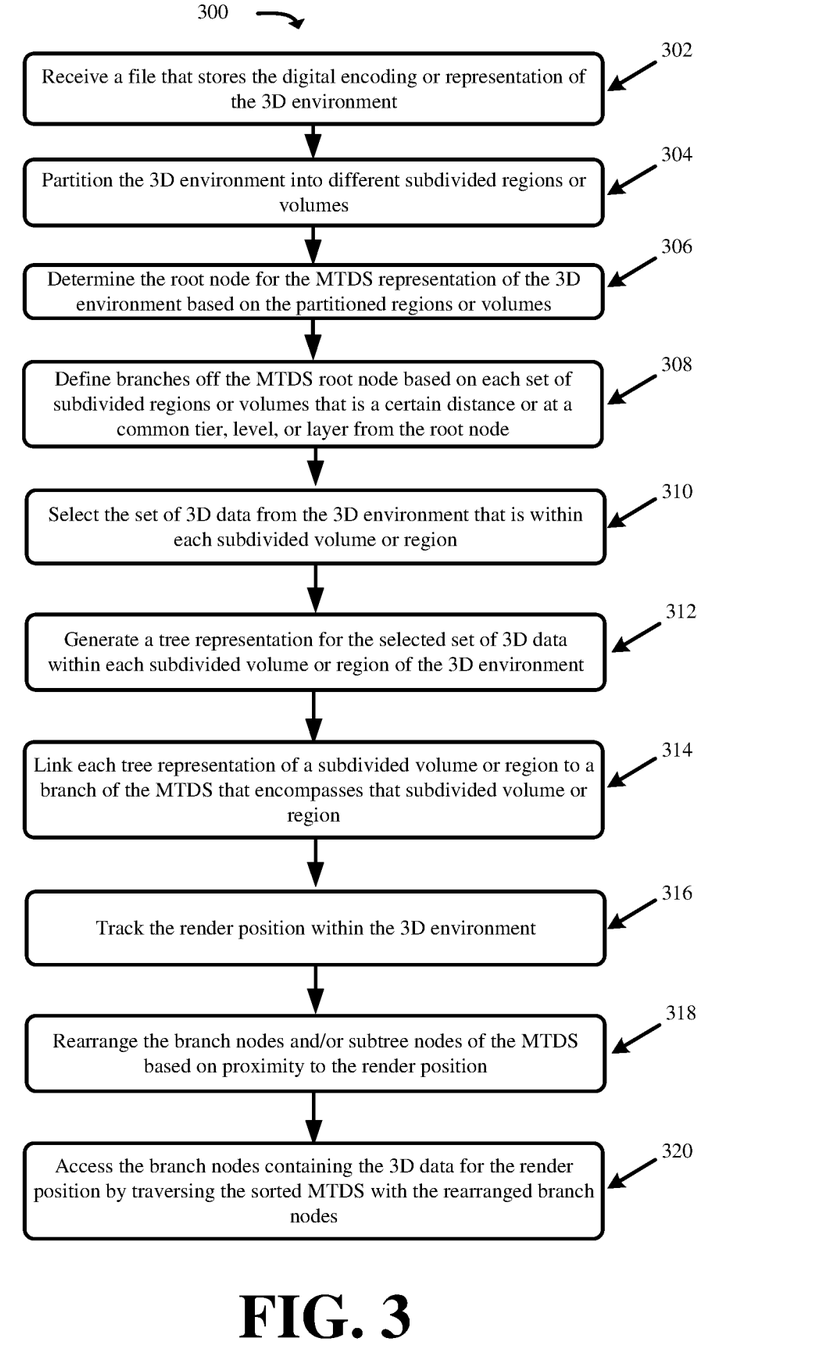
FIG. 3 presents a process for generating and mutating the MTDS in accordance with some embodiments presented herein.

FIG. 3 presents a process 300 for generating and mutating the MTDS in accordance with some embodiments presented herein. Process 300 is implemented by the editing system, wherein the editing system is a hardware device that runs software for the loading, viewing, editing, interacting, and/or processing of a 3D environment.

Process 300 includes receiving (at 302) a file that stores the digital encoding or representation of the 3D environment. The 3D environment may be encoded or represented using meshes, polygons, point cloud data points, and/or other 3D data from which the 3D environment may be digitally constructed.

Process 300 includes partitioning (at 304) the 3D environment into different subdivided regions or volumes. The size of each subdivided region or volume may be defined according to the memory constraints of editing system 100 or the device on which the 3D environment is accessed. In some embodiments, the size of each subdivided region or volume is set at or less than the available memory of editing system 100. In some such embodiments, the tree-based representations that are created for each subtree node and each subdivided region or volume are ensured to fit in the memory that is available to editing system 100. Each subdivided region or volume encompasses a different set of 3D data from the 3D environment.

Process 300 includes determining (at 306) the root node for the MTDS representation of the 3D environment based on the partitioning (at 304) of the regions or volumes. Determining (at 306) the root node includes inspecting the density or concentration of the data within each of the partitioned (at 304) regions, determining the center of mass for the file based on a subset of neighboring regions or volumes with the highest density or concentration of data. In some other embodiments, the root node may be set relative to other positions or elements of the 3D environment. For instance, the root node may be defined based on an initial or default render position that is specified for the 3D environment, a field-of-view for bounding box for a first frame of animation, and/or at position that encompasses the entirety of the 3D environment.

In some embodiments, the position of the root node may be set before partitioning the 3D environment into the different subdivided regions or volumes. For instance, editing system 100 may analyze the 3D data of the received 3D environment to identify the center of mass or the center point of the 3D environment, wherein the center of mass corresponds to the 3D environment region with the highest density of 3D data. Editing system 100 sets the root node at the identified center of mass or center point, may begin the partitioning of the 3D environment at or around the position of the root node, and may continue the partitioning outward to create the subdivided regions or volumes at different tiers or levels from the root node.

Process 300 includes defining (at 308) the different branches and/or branch nodes of the MTDS that are accessible from the root node based on each set of subdivided regions or volumes that is a certain distance or at a common tier, level, or layer from the root node. Accordingly, a first branch and/or first branch node is created for a first set of subdivided regions or volumes that directly surround the root node, a second branch and/or second branch node is created for a second set of subdivided regions or volumes that neighbor the first set of subdivided regions or volumes and that are separated from the root node by the first set of subdivided regions or volumes, a third branch and/or third branch node is created for a third set of subdivided regions or volumes that neighbor the second set of subdivided regions or volumes and that are separated from the root node by the first set of subdivided regions or volumes and the second set of subdivided regions or volumes, and so on until all the subdivided regions or volumes of the 3D environment are associated with one branch and/or branch node of the MTDS.

Process 300 includes selecting (at 310) the set of 3D data from the 3D environment that is within each subdivided volume or region. For instance, each subdivided volume or region spans a different set of coordinates within the 3D represented, and editing system 100 selects (at 310) the 3D data with positional element falling within the coordinates of a subdivided volume or region.

Process 300 includes generating (at 312) a tree representation for the selected (at 310) set of 3D data within each subdivided volume or region of the 3D environment. Editing system 100 may generate (at 312) a different octree, binary tree, k-d tree, or other tree representation for the 3D data within subdivided volume or region of the 3D environment. Accordingly, editing system 100 generates (at 312) a set of subtrees that collectively represent and/or contain the 3D data for the entire 3D environment, with each subtree of the set of subtree representing and/or containing the 3D data within a different region or volume of the 3D environment.

Process 300 includes linking (at 314) each tree representation of a subdivided volume or region to a branch of the MTDS that encompasses that subdivided volume or region. Each tree representation that is linked to a particular branch becomes a subtree node that may be traversed or accessed via the branch node of that particular branch. A particular subtree node is accessed by traversing from the MTDS root node to the branch node of the branch containing the particular subtree node, and traversing the subtree nodes of the branch and/or branch node until the particular subtree node is reached. The tree representations are linked (at 314) to the MTDS branches based on their distance from the root node and the associated distance of the MTDS branches from the root node.

Process 300 includes tracking (at 316) the render position within the 3D environment. In some embodiments, the render position corresponds to the positioning of a virtual camera within the 3D environment or a line-of-sight established from the virtual camera position. In some embodiments, the render position is the bounding box that corresponds to the visualized or rendered region of the 3D environment.

Process 300 includes rearranging (at 318) the branch nodes and/or subtree nodes of the MTDS based on proximity to the render position. Rearranging (at 318) the subtree nodes includes sorting the subtree nodes so that the first node in a branch or the first subtree node linked to the branch node is the closest subdivided region in that branch to the render position.

Process 300 includes accessing (at 320) the one or more subtree nodes containing the 3D data for the tracked (at 316) render position by traversing the sorted MTDS with the rearranged (at 318) subtree nodes. In some embodiments, accessing (at 320) the one or more subtree nodes includes determining a distance of the current render position from the position of the MTDS root node, traversing from the MTDS root node to the branch node representing the branch at the determined distance, and loading in the subtree or the 3D data contained in the subtree that is linked to at least the first node in that branch. In some other embodiments, accessing (at 320) the one or more subtree nodes includes determining coordinates of the view frustum or the bounding box for the field-of-view of the camera at the render position, computing the distance to each edge or corner of the view frustum, traversing from the MTDS root node to the branch for the computed distance, and loading in the subtrees for the nodes within the view frustum.

In this manner, editing system 100 is able to locate the subtree containing the 3D data for the subdivided region of the 3D environment at the render position or that is within the bounding box of the render position with a minimal number of tree node traversals and queries. In most cases, a single traversal to the first node in the sorted branches is sufficient to locate the desired subtrees. Moreover, editing system 100 locates the desired subtree without having to perform a top-to-bottom traversal of a single tree that represents the entirety of the 3D environment, and without having to perform a traversal that involves inspecting the positional elements of each traversed node of the single tree until the parent or children nodes that contain the render position and exclude extraneous or surrounding data is found. Instead, a single distance calculation performed to locate the desired one or more subtree nodes within the MTDS.

Figure 4:
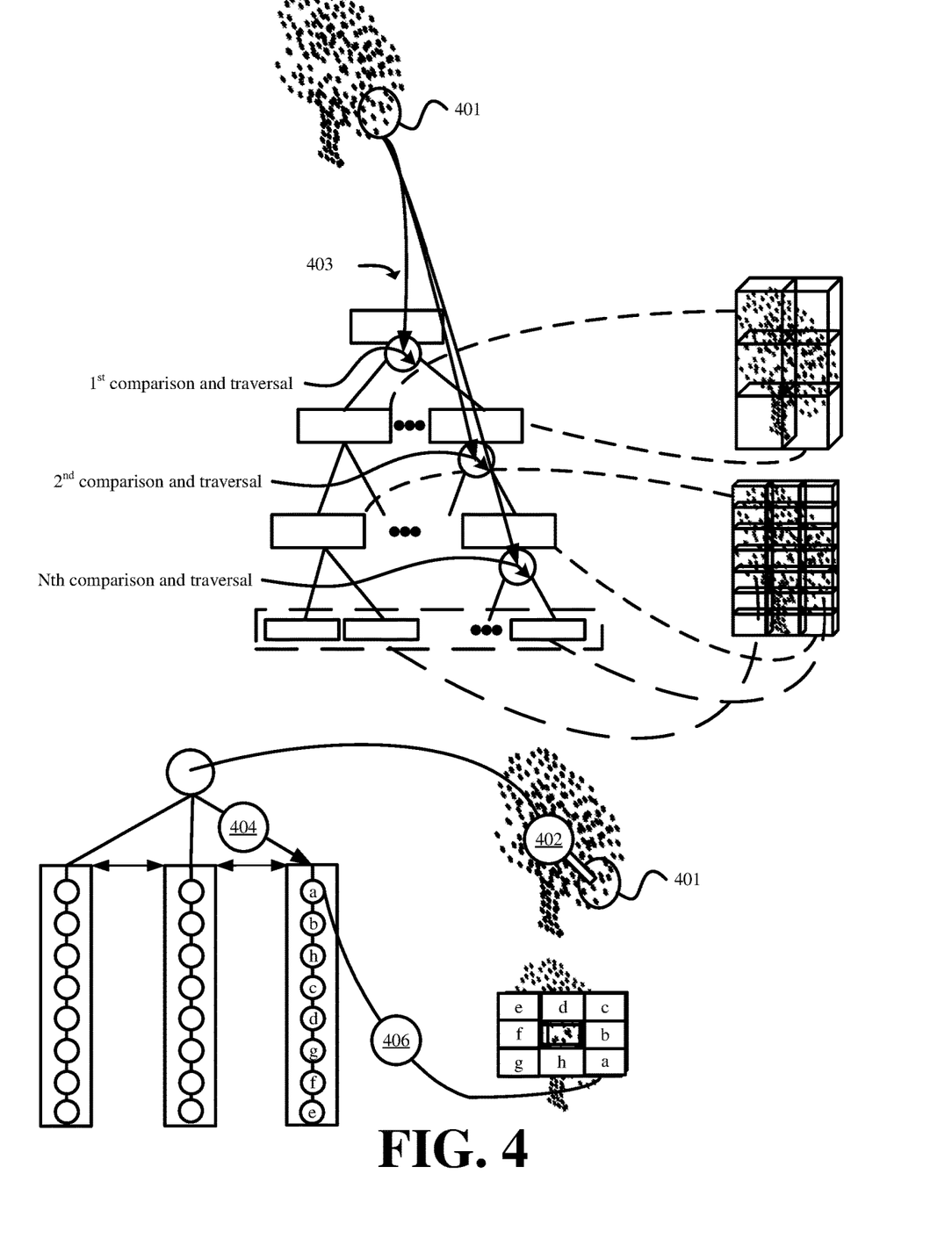
FIG. 4 illustrates the efficiencies associated with traversing the MTDS over a single tree representation of a three-dimensional ("3D") environment.

FIG. 4 illustrates the efficiencies associated with traversing the MTDS over a single tree representation of a 3D environment. A request is issued for a desired set of 3D data within region 401 of the 3D environment.

Single tree representation 403 is a multi-dimensional tree representation of the entire 3D environment. Each higher parent node in single tree representation 403 encompasses a larger portion of the entire 3D environment with less detail, and the leaf nodes correspond to the individual data points of the 3D environment.

Locating the desired set of 3D data within region 401 via single tree representation 403 involves comparing the positional elements of each child node under the root node, selecting the child node that spans region 401, and repeating the child node comparison and selection at multiple levels until the parent nodes and/or leaf nodes for the desired set of 3D data within region 401 is found. The size and length of single tree representation 403 grows as the complexity of the 3D environment grows. As the size and length of single tree representation grows 403, so too does the number of nodes that are traversed in order to locate the desired set of 3D data. For instance, if single tree representation 403 has N layers, a comparison may be performed at each of the N layers in order to locate the desired set of 3D data. Accordingly, hundreds of comparisons and traversals may be required for single tree representation 403.

The same set of 3D data is located via MTDS 405 representation of the 3D environment with fewer traversals and/or operations. As shown in FIG. 4, the distance between the root node and the current render position is computed (at 402), and the computed distance is used to select (at 404) the branch node for subdivided regions of the 3D environment that are the computed distance from the root node. In this example, the selected branch node includes the subdivided regions that are a first distance from the MTDS root node. However, the subtree nodes within the selected branch node are sorted based on their distance from region 401. Accordingly, the desired set of 3D data is located by accessing (at 406) the first subtree node linked to the selected branch node with the first subtree node representing the subdivided region that is closet to region 401 and that is the computed distance from root node.

Even if region 401 spans a wider region that what is included within a single subdivided region. Editing system 100 is easily able to locate and select the neighboring subdivided regions as they are sorted based on distance and will include the next subtree node underneath the first subtree node in the same branch, or the first subtree node in the next adjacent branch accessed via a horizontal branch node traversal.

Figure 5:
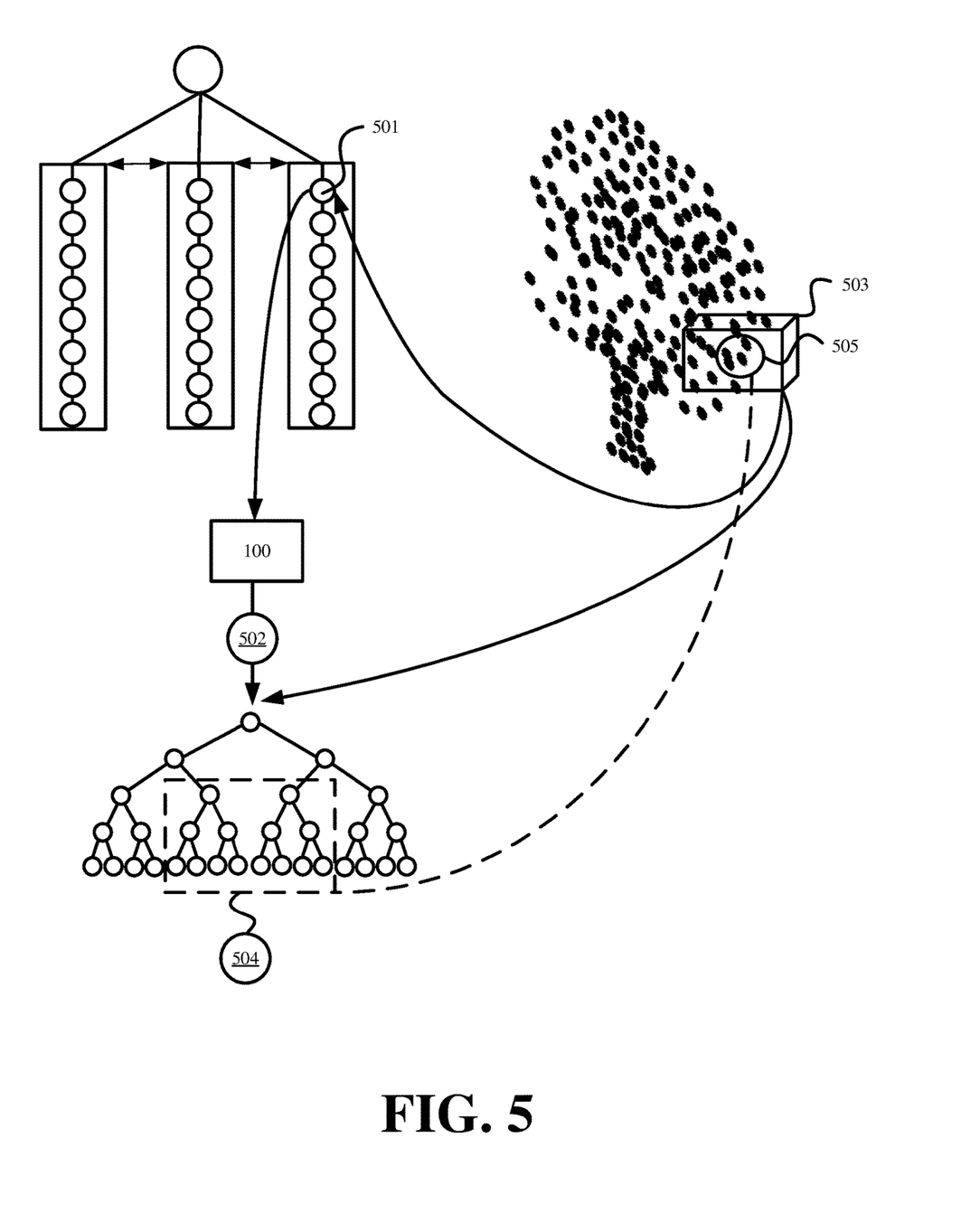
FIG. 5 illustrates the selection of nodes within a subtree of the MTDS in accordance with some embodiments presented herein.

Moreover, if the subtree or subdivided region represented by a selected subtree node includes 3D data outside of a desired region, then editing system 100 may traverse the subtree that is associated with the selected subtree node to exclude the leaf nodes or parent nodes corresponding to the 3D data outside of the directed region. FIG. 5 illustrates the selection of nodes within a subtree of the MTDS in accordance with some embodiments presented herein.

As shown in FIG. 5, selected subtree node 501 of the MTDS represents subdivided region 503 of the 3D environment that is larger than a desired subregion 505. Accordingly, editing system 100 retrieves (at 502) the subtree associated with selected subtree node 501, and traverses the subtree to select (at 504) the nodes within the subtree that contains the 3D data within the desired subregion 505.

In some embodiments, the sorting and rearranging of the MTDS is performed separate and independent of the searching and accessing of nodes (e.g., branch nodes, subtree nodes, etc.) within the MTDS. Specifically, a first thread or process is generated to continually sort and rearrange the branches nodes and/or subtree nodes of the MTDS as the render position changes so that requests to search or access 3D data from the 3D environment may be executed by a second thread or process on the MTDS that is sorted by the first thread or process.

In some such embodiments, the first thread or process generates the MTDS for a 3D environment once the 3D environment is opened or accessed. The MTDS may be generated when the 3D environment is first created, and may be stored as part of the file that contains the polygons, meshes, data points, and/or other constructs that form the 3D environment. In other words, the MTDS with branch nodes and subtree nodes arranged according to their distance from the MTDS root node may be stored as part of the file containing the 3D data for the 3D environment, and is not regenerated every time the file is accessed or opened.

The first thread or process runs is a background thread or process of editing system 100 that continuously executes while the 3D environment is open or being accessed. The first thread or process sorts the MTDS based on the changing render position. Specifically, the first thread or process rearranges the branch nodes and/or subtree nodes of the MTDS based on their distance to the changing render position, and links the subtree nodes that are closest to the current render position at the top of the respective branch nodes or as neighbors of the subtree node that encompasses the current render position.

Editing system 100 executes the second thread or process in response to user input. The second thread or process is tasked with editing and rendering the 3D environment using the sorted 3D data of the MTDS produced by the first thread or process. The second thread or process therefore runs in parallel with the first thread or process, and accesses, edits, renders, and/or processes different sets of 3D data at the render position in response to corresponding user input for accessing, editing, rendering, and/or processing the different set of 3D data.

Editing system 100 may perform different traversals of the MTDS to quickly and efficiently access desired datasets. The different traversals include iterating through the MTDS starting at the root node, iterating with memory to commence traversals from the last position within the MTDS, performing a neighborhood search based on a Gaussian interpolation and/or radial segmentation of the branch nodes and subtree nodes, and/or performing a path of closest approach traversal.

Figure 6:
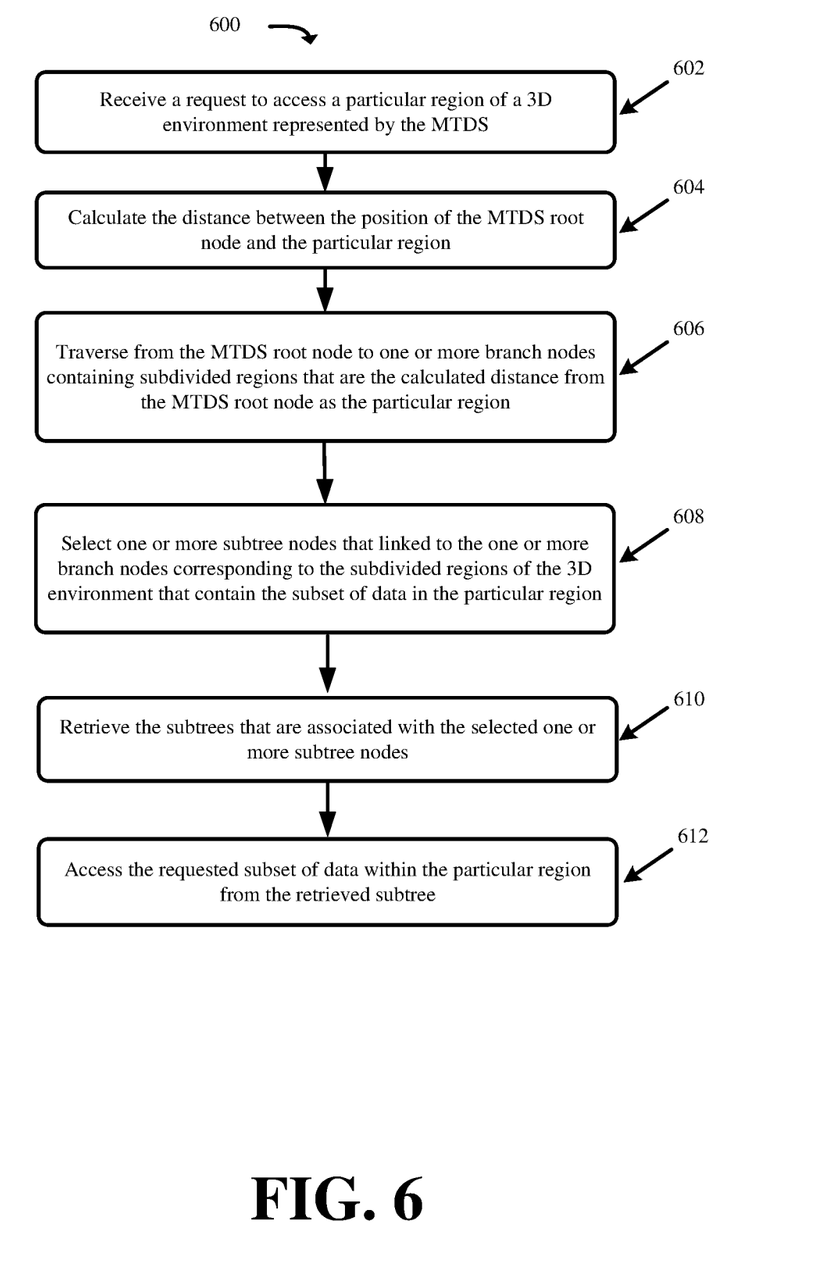
FIG. 6 presents a process for traversing the MTDS to access a desired subset of data in accordance with some embodiments presented herein.

FIG. 6 presents a process 600 for traversing the MTDS to access a desired subset of data in accordance with some embodiments presented herein. Process 600 is implemented by editing system 100 and requires the background execution of the first thread or process to provide a sorted MTDS.

Process 600 includes receiving (at 602) a request to access the subset of data within a particular region of a 3D environment represented by the MTDS. For instance, the request may involve a user selection of the particular region or moving a camera so that the camera field-of-view or view frustum encompasses the particular region.

Process 600 includes calculating (at 604) the distance between the position of the MTDS root node and the particular region. In some embodiments, the distance calculation may be between the MTDS root node position and the average or mean position within the subset of data. In some embodiments, the distance calculation may include calculating (at 604) the distance between the position of the MTDS root node and each edge or corner of a view frustum or bounding box that encompasses the subset of data. In other words, the request may not include the positional coordinates for the subset of data. Instead, the request may involve changing the render position from a first position within the 3D environment to a second position, and editing system 100 calculates (at 604) the distance between the position of the MTDS to the second position or the coordinates of a view frustum that originates from the second position.

Process 600 includes traversing (at 606) from the MTDS root node to one or more branch nodes representing branches that contain subdivided regions that are the calculated distance from the MTDS root node as the particular region. When the particular region extends between two different branches, the traversal (at 606) involves traversing to the branch nodes for those two different branches.

Process 600 includes selecting (at 608) one or more subtree nodes in the one or more branches corresponding to the subdivided regions of the 3D environment that encompass the particular region and contain the subset of data. Specifically, editing system 100 determines if the region spanned by the first subtree node linked to a traversed branch node encompasses the entire view frustum or bounding box for the subset of data. If the view frustum or bound box extends to a neighboring region, editing system 100 selects the next subtree node (e.g., the second node) in the particular branch that spans the neighboring region or a first subtree node in a neighboring branch node that extends into the neighboring region.

Process 600 includes retrieving (at 610) the subtrees that are associated with the selected (at 608) one or more subtree nodes. In some embodiments, the selected one or more subtree nodes correspond to the root nodes of the different subtrees.

Process 600 includes accessing (at 612) the requested subset of data within the particular region from the retrieved (at 610) subtree. When the subtree represents a subdivided region that is entirely within the particular region, accessing (at 612) the requested subset of data includes reading all the data contained within that subtree. When the subtree represents a subdivided region that is partly within the particular region, accessing (at 612) the requested subset of data includes traversing the retrieved subtrees to select the nodes that contain the requested subset of data within the particular region and to exclude the nodes that contain data outside the particular region.

Figure 7:
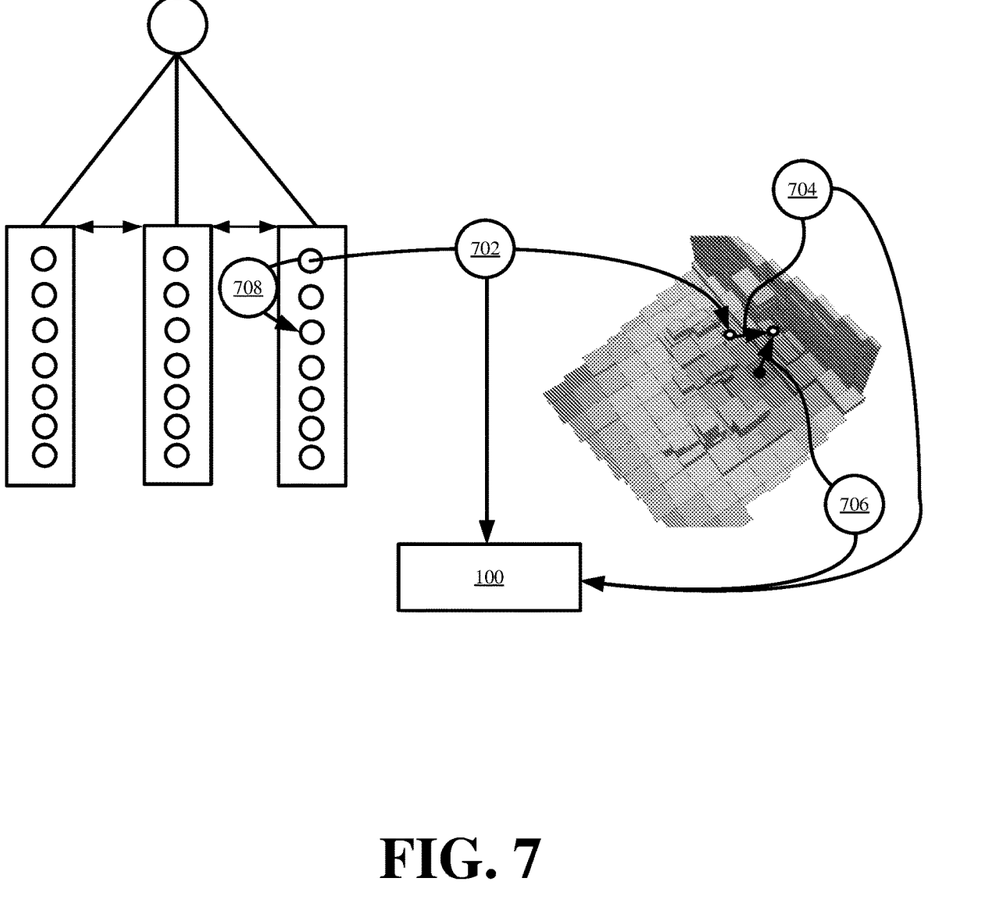
FIG. 7 illustrates an example of searching within a 3D environment by iterating through the MTDS with memory in accordance with some embodiments presented herein.

FIG. 7 illustrates an example of searching within a 3D environment by iterating through the MTDS with memory in accordance with some embodiments presented herein. Editing system 100 tracks (at 702) the last accessed subtree node within the MTDS for the 3D data of the 3D environment that is accessed from a first position.

Editing system 100 detects the field-of-view changing from the first position to a second position within the 3D environment. Editing system 100 determines (at 704) the positional delta between the first position and the second position. The positional delta is the distance from the first position to the second position. Editing system 100 computes (at 706) the distance between the position of the MTDS root node and the second position.

Editing system 100 selects (at 708) a next subtree node within the MTDS by moving one or more subtree nodes down in the same MTDS branch or by moving to a neighboring MTDS branch and accessing a subtree node therein based on the determined (at 704) positional delta between the first position and the second position and the computed (at 706) distance between the MTDS root node and the second position. The positional delta indicates how far the second position is from the first position. For instance, editing system 100 uses the computed (at 706) distance between the MTDS root node and the second position to determine that the second position is at the same level or branch of the MTDS as the first position. Accordingly, the selection (at 708) of the next subtree node remains within the same MTDS branch as the last accessed subtree node. Editing system 100 then uses the determined (at 704) positional delta to determine the number of subtree nodes to move up or down within the same branch to select (at 708) the next subtree node.

In some embodiments, editing system 100 traverses the MTDS and accesses the 3D data for the second position from the last accessed subtree node without resorting the MTDS nodes. In some such embodiments, the last accessed subtree node is the first subtree node linked to the selected branch node, and the positional delta combined with the distance of the second position from the MTDS root node indicate the number of subtree nodes to move down from the first subtree node in order to select the subtree node in the same selected branch that contains the 3D data for the second position. For instance, if the second position is in a subdivided region that is adjacent to the subdivided region of the first position and the neighboring subdivided region of the second position is the next closest region to the MTDS root node, then the traversal involves moving a single down in the selected branch. However, if the second position is in a subdivided region that is adjacent to the subdivided region of the first position and the neighboring subdivided region of the second position is not the next closest region to the MTDS root node, then the traversal involves moving more than one subtree node down in the selected branch based on the number of neighboring subdivided regions in the selected branch that are closer to the MTDS root node.

In some other embodiments, editing system 100 resorts the MTDS nodes based on the computed distance of the second position from the MTDS root node. In some such embodiments, iterating with memory involves moving from the last accessed subtree node in the selected branch (which is resorted based on the distance to the second position) to the first subtree node which contains the 3D data at the second position.

Iterating through the MTDS with memory therefore allows the MTDS traversal and searching within the 3D environment to commence from the last tracked MTDS position rather than from the MTDS root node. As a result, the desired 3D data is discovered faster and with fewer traversals when the movements are to neighboring subdivided regions within the same branch.

The MTDS allows 3D files to be rapidly searched, accessed, and/or manipulated on devices with limited memory by simplifying the searching of the 3D data based on distance rather than on positional elements associated with tree nodes, and by partitioning a monolithic or single tree representation of the 3D environment into a multiple subtrees that contain the 3D data for subdivided regions of interest. The partitioning further allows for individual subtree to be loaded into and out of the limited device memory and for the partitioned processing of the 3D file so that the devices do not have to load or retain the 3D data for the entire 3D environment in memory.

Figure 8:
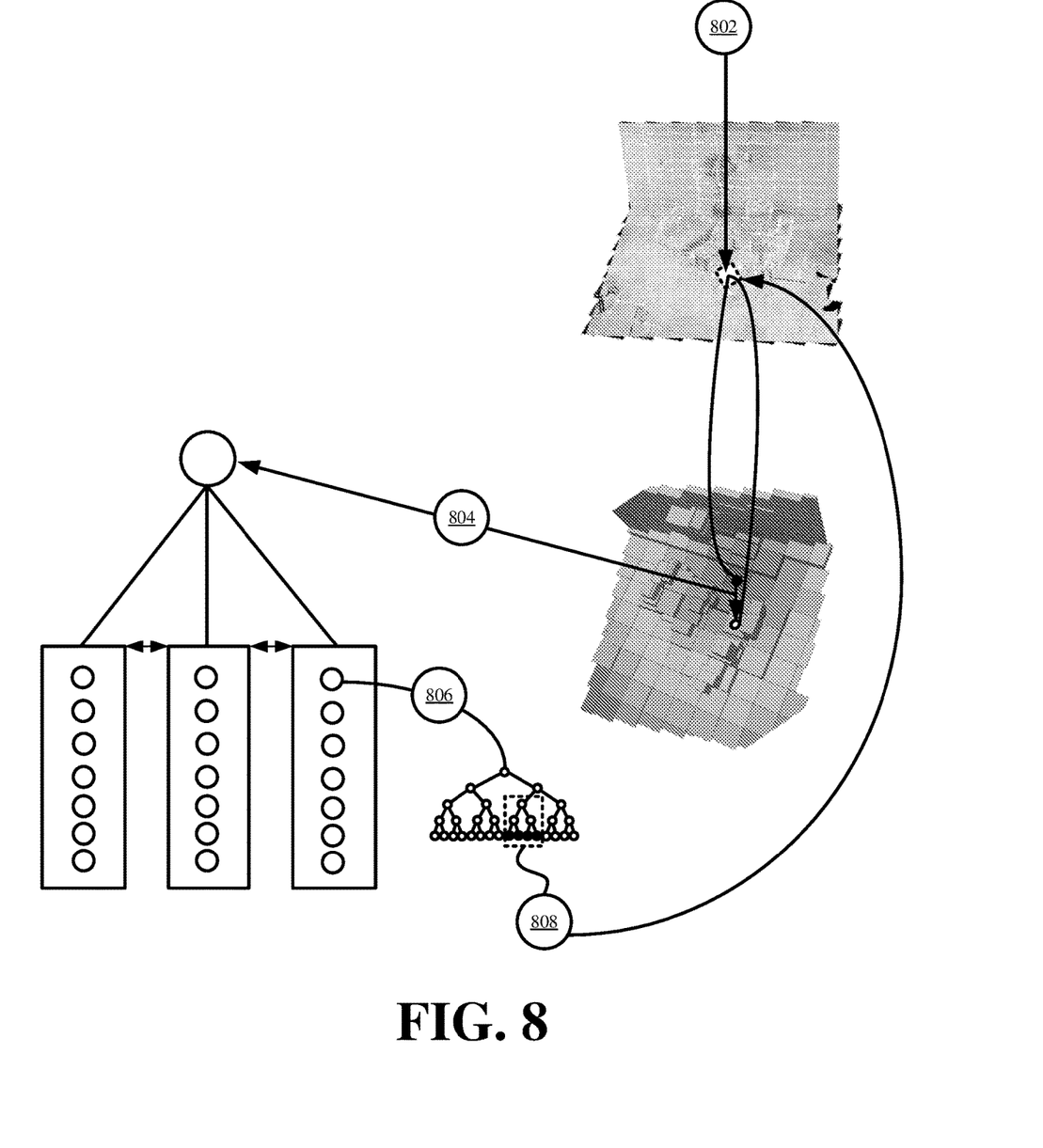
FIG. 8 illustrates an example of using the MTDS for editing a point cloud in accordance with some embodiments presented herein.

FIG. 8 illustrates an example of using the MTDS for editing a point cloud in accordance with some embodiments presented herein. An edit (at 802) is applied to a set of data points of the point cloud.

Editing system 100 sorts (at 804) the MTDS based on one or more positions associated with the set of data points, and selects (at 806) the one or more subtree nodes that span the subdivided region with the edited set of data points. Specifically, editing system 100 loads into memory the one or more subtrees containing the 3D data for the subdivided regions with the set of data points represented by the selected (at 806) one or more subtree nodes.

Editing system 100 edits (at 808) the set of data points. Specifically, a selected (at 806) subtree node may be associated with a subtree that contains the set of data points and other data points that surround the set of data points. Accordingly, editing (at 808) the set of data points includes traversing the subtree to identify the set of data points therein, and applying the edit to change the positional element or non-positional elements (e.g., color values) of just the set of data point within the subdivided region of the node selected (at 806) from the MTDS.

After applying the edit, editing system 100 may update the selected (at 806) subtree node in the MTDS. Updating the subtree node may include linking the subtree node to a different branch or different location within the current branch when the edit involves a move, cut and paste operation, or other repositioning of the set of data points. In some embodiments, updating the subtree node involves regenerating the subtree for the selected (at 806) subtree node when the edit adjusts positional or non-positional elements of the set of data points, or when the edit is applied to less than all of the data points of the subtree.

The MTDS also provides a format that supports the efficient and intelligent streaming of large 3D files from one device to another. In particular, rather than stream the 3D data from an entire 3D environment from a first device to a second device in sequential order, the first device may prioritize the streaming of the current selected subtree node and the sorted subtree nodes that are closest to the selected subtree node to the second device. The second device reconstructs the 3D environment based on the subtree nodes that are streamed from the first device to the second device according to the prioritized ordering. For instance, the first device determines a first node in a particular branch that contains the 3D data for the current viewing position. The first device streams the first node (e.g., the first subtree associated with the first node) to the second device, and then streams the subtrees for other nodes in the particular branch that are adjacent to the subdivided region of the first node. The first device moves to the neighboring branches of the MTDS, and streams the first node in each of the neighboring branches to the second device so that the second device receives the 3D data for the current viewing position as well as the 3D data surrounding the current view position before receiving other 3D data that is more distant from the viewing position.

Figure 9:
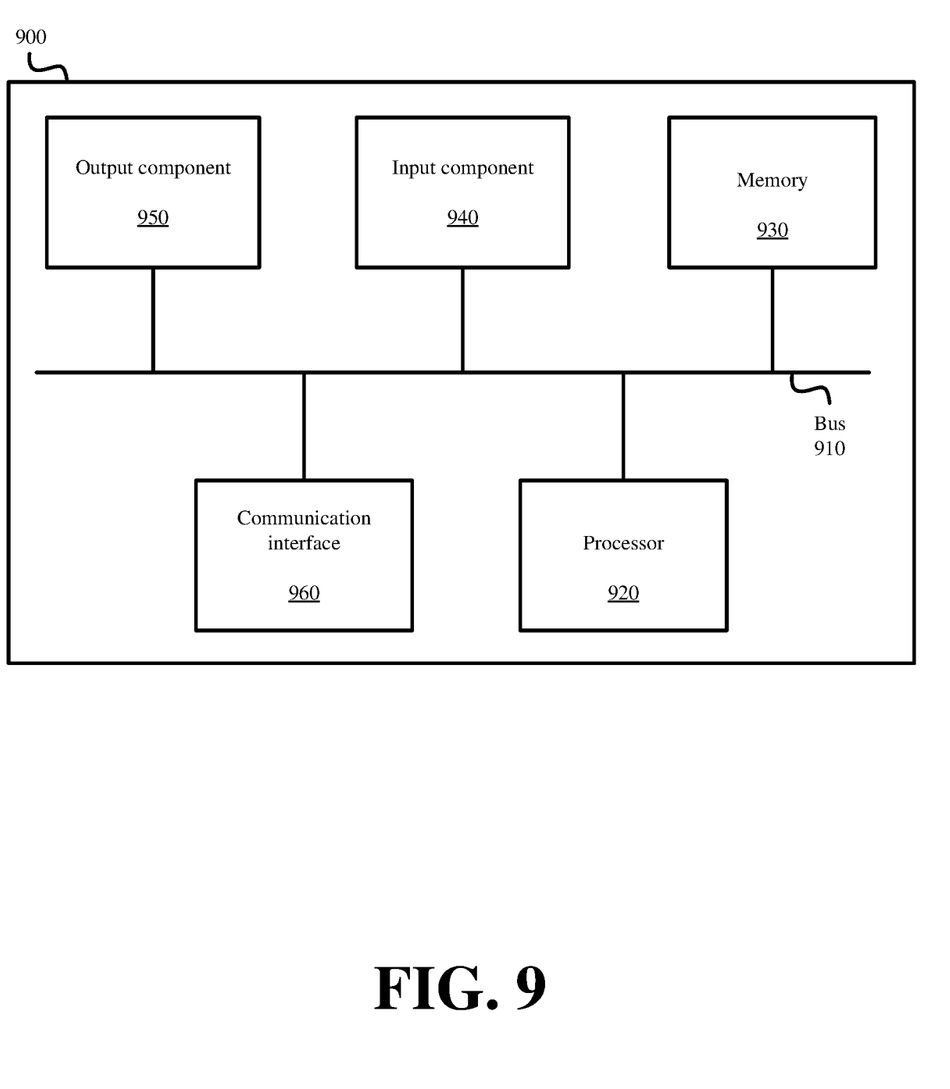
FIG. 9 illustrates example components of one or more devices, according to one or more embodiments described herein.

FIG. 9 is a diagram of example components of device 900. Device 900 may be used to implement one or more of the devices or systems described above (e.g., editing system 100, user devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device

900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A method comprising:
receiving a three-dimensional ("3D") environment comprising a plurality of 3D data distributed across a 3D space;

determining a root node position within the 3D space;
partitioning the 3D space into a plurality of subdivided regions;
determining a first set of the plurality of subdivided regions that are a first distance from the root node position, and a second set of the plurality of subdivided regions that are a second distance from the root node position;
generating a mutable tree to represent the 3D environment, the mutable tree comprising a root node defined at the root node position, a first branch node that is linked to the root node and that provides access to a first set of subtree nodes for each subdivided region of the first set of subdivided regions, and a second branch node that is linked to the root node and that provides access to a second set of subtree nodes for each subdivided region of the second set of subdivided regions;
receiving a request to access 3D data from a first position within the 3D space; and
sorting the mutable tree based on a distance between the first position and each subtree node of the first set of subtree nodes and the second set of subtree nodes, wherein sorting the mutable tree comprises changing a first subtree node that is accessible from the first branch node to be a subtree node from the first set of subtree nodes that is closest to the first position, and changing a first subtree node that is accessible from the second branch node to be a subtree node from the second set of subtree nodes that is closest to the first position.

2. The method of claim 1 further comprising:
determining that the first position is the second distance from the root node position; and
accessing the first subtree node from the second branch node in response to the request.

3. The method of claim 2, wherein accessing the first subtree node comprises:
loading, into memory, a subtree that contains a set of the plurality of 3D data that is within a subdivided region represented by the first subtree node that is accessible from the second branch node, wherein the first subtree node that is accessible from the second branch node is a root node of the subtree.

4. The method of claim 1 further comprising:
associating a subtree to each subtree node of the first set of subtree nodes and the second set of subtree nodes, wherein a particular subtree is an organization of a set of the plurality of 3D data that is within a particular subdivided region represented by a subtree node associated with the particular subtree.

5. The method of claim 4 further comprising:
providing a particular subtree that is associated with the first subtree node that is accessible from the second branch node in response to the first position being the second distance from the root node position and said sorting of the mutable tree rearranging the second set of subtree nodes with the first subtree node that is accessible from the second branch node representing a subdivided region that is the second distance from the root node position and closest to the first position.

6. The method of claim 1 further comprising:
computing a distance between the first position and the root node position; and
returning the first subtree node that is accessible from the second branch node in response to the request based on the distance between the first position and the root node position being closer to the second distance than the first distance.

7. The method of claim 6, wherein returning the first subtree node that is accessible from the second branch node comprises:
providing a subtree that is associated with the first subtree node that is accessible from the second branch node in response to the request, wherein the subtree comprises a set of the plurality of 3D data in a subdivided region that is the second distance from the root node position and that is closest to the first position.

8. The method of claim 1 further comprising:
traversing from the root node of the mutable tree to the first branch node in response to the first position being the first distance from the root node position; and
traversing from the root node of the mutable tree to the second branch node in response to the first position being the second distance from the root node position.

9. The method of claim 1 further comprising:
traversing from the root node of the mutable tree to the second branch node in response to the first position being the second distance from the root node position; and
accessing a set of the plurality of 3D data associated with the first subtree node that is accessible from the second branch node in response to the request.

10. The method of claim 1 further comprising:
detecting a change from the first position to a different second position within the 3D space; and
resorting the mutable tree based on a distance between the second position and each subtree node of the first set of subtree nodes and the second set of subtree nodes, wherein resorting the mutable tree comprises changing the first subtree node that is accessible from the first branch node to be a different subtree node from the first set of subtree nodes that is closest to the second position, and changing the first subtree node that is accessible from the second branch node to be a subtree node from the second set of subtree nodes that is closest to the second position.

11. The method of claim 10 further comprising:
receiving a request for 3D data at the second position; and
providing the first subtree node that is accessible from the first branch node in response to the request for 3D data at the second position after said resorting of the mutable tree.

12. The method of claim 1 further comprising:
providing the first subtree node that is accessible from the second branch node in response to the request to access the 3D data from the first position and the first position being the second distance from the root node position;
receiving a request for 3D data at a different second position; and
providing the first subtree node that is accessible from the first branch node in response to the request for 3D data at the second position and the second position being the first distance from the root node position.

13. The method of claim 1 further comprising:
determining a center of mass within the plurality of 3D data of the 3D environment; and
setting the root node position at the center of mass.

14. The method of claim 1 further comprising:
determining a center of the 3D space; and
setting the root node position at the center of the 3D space.

15. The method of claim 1 further comprising:
determining a maximum density with which the plurality of 3D data is distributed across the 3D space; and
defining each subdivided region of the plurality of subdivided regions to have a common size that is determined based on the maximum density.

16. The method of claim 1 further comprising:
defining a size of each subdivided region of the plurality of subdivided regions to include a specific amount of the plurality of 3D data.

17. An editing system comprising:
one or more hardware processors configured to:
receive a three-dimensional ("3D") environment comprising a plurality of 3D data distributed across a 3D space;
determine a root node position within the 3D space;
partition the 3D space into a plurality of subdivided regions;
determine a first set of the plurality of subdivided regions that are a first distance from the root node position, and a second set of the plurality of subdivided regions that are a second distance from the root node position;
generate a mutable tree to represent the 3D environment, the mutable tree comprising a root node defined at the root node position, a first branch node that is linked to the root node and that provides access to a first set of subtree nodes for each subdivided region of the first set of subdivided regions, and a second branch node that is linked to the root node and that provides access to a second set of subtree nodes for each subdivided region of the second set of subdivided regions;
receive a request to access 3D data from a first position within the 3D space; and
sort the mutable tree based on a distance between the first position and each subtree node of the first set of subtree nodes and the second set of subtree nodes, wherein sorting the mutable tree comprises changing a first subtree node that is accessible from the first branch node to be a subtree node from the first set of subtree nodes that is closest to the first position, and changing a first subtree node that is accessible from the second branch node to be a subtree node from the second set of subtree nodes that is closest to the first position.

18. The editing system of claim 17, wherein the one or more hardware processors are further configured to:
determine that the first position is the second distance from the root node position; and
access the first subtree node from the second branch node in response to the request.

19. The editing system of claim 17, wherein the one or more hardware processors are further configured to:
compute a distance between the first position and the root node position; and
return the first subtree node that is accessible from the second branch node in response to the request based on the distance between the first position and the root node position being closer to the second distance than the first distance.

20. A non-transitory computer-readable medium storing program instructions that, when executed by one or more hardware processors of an editing system, cause the editing system to perform operations comprising:
receive a three-dimensional ("3D") environment comprising a plurality of 3D data distributed across a 3D space;
determine a root node position within the 3D space;
partition the 3D space into a plurality of subdivided regions;
determine a first set of the plurality of subdivided regions that are a first distance from the root node position, and a second set of the plurality of subdivided regions that are a second distance from the root node position;
generate a mutable tree to represent the 3D environment, the mutable tree comprising a root node defined at the root node position, a first branch node that is linked to the root node and that provides access to a first set of subtree nodes for each subdivided region of the first set of subdivided regions, and a second branch node that is linked to the root node and that provides access to a second set of subtree nodes for each subdivided region of the second set of subdivided regions;
receive a request to access 3D data from a first position within the 3D space; and
sort the mutable tree based on a distance between the first position and each subtree node of the first set of subtree nodes and the second set of subtree nodes, wherein sorting the mutable tree comprises changing a first subtree node that is accessible from the first branch node to be a subtree node from the first set of subtree nodes that is closest to the first position, and changing a first subtree node that is accessible from the second branch node to be a subtree node from the second set of subtree nodes that is closest to the first position.

* * * * *